United States Patent
Coon

[11] Patent Number: 5,966,270
[45] Date of Patent: *Oct. 12, 1999

[54] LOAD BEAM WITH UNITARY LIFT FEATURE

[75] Inventor: Warren Coon, Temecula, Calif.

[73] Assignee: Magnecomp Corporation, Temecula, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/960,646

[22] Filed: Oct. 30, 1997

[51] Int. Cl.⁶ .............................. G11B 5/54; G11B 21/22
[52] U.S. Cl. ........................................ 360/104; 360/105
[58] Field of Search ..................... 360/103–109

[56] References Cited

U.S. PATENT DOCUMENTS

| | | | |
|---|---|---|---|
| 3,713,121 | 1/1973 | Fasano et al. | 360/105 X |
| 4,535,374 | 8/1985 | Anderson et al. | 360/103 |
| 4,663,682 | 5/1987 | McNeil | 360/105 |
| 5,012,370 | 4/1991 | Hikichi et al. | 360/105 |
| 5,142,424 | 8/1992 | Hatamura | 360/104 |
| 5,237,472 | 8/1993 | Morehouse et al. | 360/105 |
| 5,291,359 | 3/1994 | Wolter | 360/104 |
| 5,408,375 | 4/1995 | Asano | 360/105 |
| 5,530,607 | 6/1996 | Spendlove | 360/105 |
| 5,636,085 | 6/1997 | Jones et al. | 360/103 |
| 5,742,454 | 4/1998 | Vera et al. | 360/105 |
| 5,768,059 | 6/1998 | Bishop et al. | 360/105 |

*Primary Examiner*—William J. Klimowicz
*Attorney, Agent, or Firm*—Louis J. Bachand

[57] ABSTRACT

Disk drive suspension load beam has a unitary lift bracket formed from a deflection of the load beam distal portion laterally of the load beam into a curvilinear shape to define a cam follower adapted to engage a camming surface used to lift the load beam carried head from its normal proximity to a disk.

4 Claims, 2 Drawing Sheets

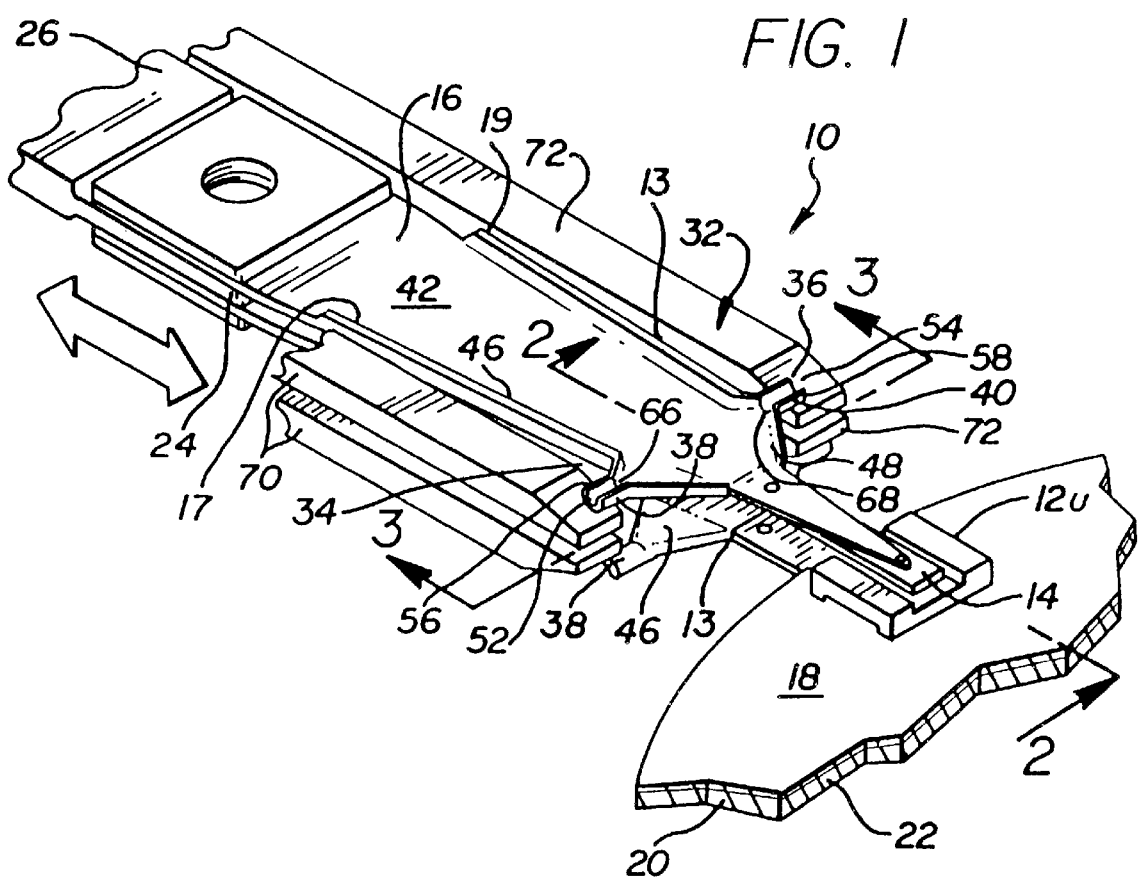

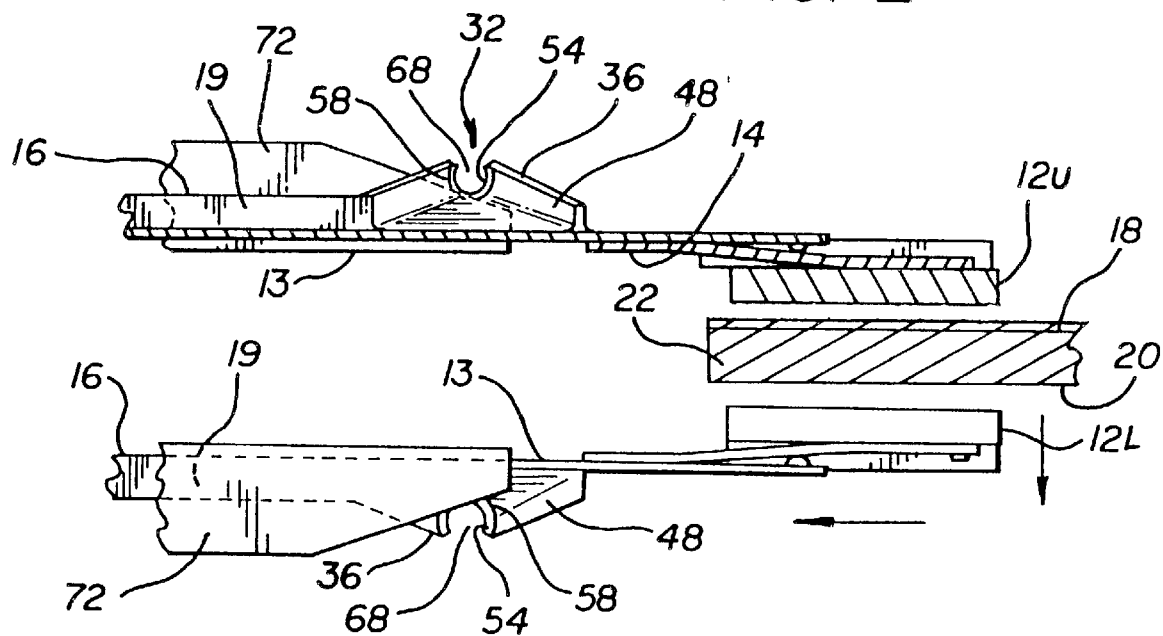
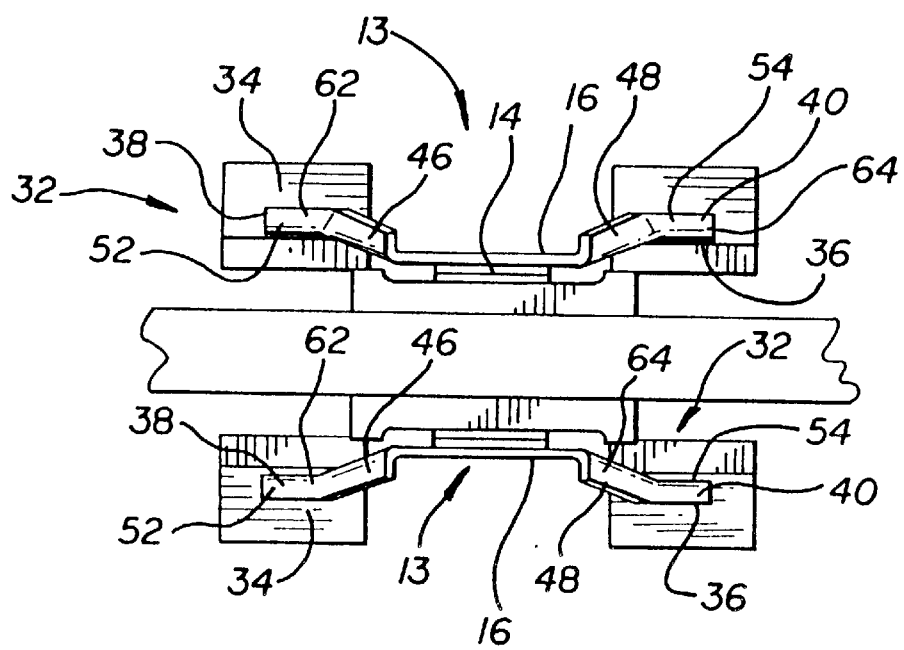

LOAD BEAM WITH UNITARY LIFT FEATURE

TECHNICAL FIELD

This invention relates to disk drive assemblies and, more particularly, to suspensions for removable disk drives which afford lifting capability inward of the read/write head carried by the suspension. In a particular aspect, the invention provides a unitary lift bracket at a locus intermediate the inner and outer ends of the load beam of the suspension. The bracket comprises left and right hand cam followers and left and right hand cam follower supports, the cam followers and their supports being formed from the load beam body metal itself to be unitary with the load beam.

BACKGROUND OF THE INVENTION

Disk drives are normally very closely spaced to their opposing read/write heads, making removal of the disks problematic unless the read/write head is momentarily lifted. Expedients for so lifting the heads must be sufficiently small as to fit in the available working space, and positive in their action to ensure achieving the desired separation space and avoid damage to the components. The use of suspension extensions beyond the normal length of the suspension to ride a camming surface to effect lift is known, but this technique requires added structure on the suspension flexure, increased weight beyond the normal suspension terminus, and cantilevering of this added weight. In U.S. Pat. No. 5,530,607 to Spendlove a lift bracket is shown comprising a pair of wings in the form of cylindrical rods supported in attachment devices having interference fit notches. While seemingly simple, the Spendlove device requires insertion and retention of tiny rods in place and is potentially troublesome in manufacturing unless great care is taken, at added expense.

SUMMARY OF THE INVENTION

It is an object of the invention to provide a lift feature for a disk drive suspension. It is a further object to provide a novel disk drive suspension in which the suspension load beam is modified rearwardly of the head locus to define a lifting structure. Still another object of the invention is to provide a camming surface laterally of the suspension load beam and a cam follower unitary with the load beam and located rearwardly of the head and forwardly of the suspension actuator, so that longitudinal axial shifting of a camming surface adjacent the suspension engages the cam follower with the camming surface and lifts the head relative to the disk drive disk, permitting disk removal or insertion without added structure being appended onto the suspension.

These and other objects of the invention to become apparent hereinafter, are realized in a load beam for supporting at its distal portion a flexure carrying a head in operative association with a disk drive having a removable disk and an actuator for shifting the load beam along its longitudinal axis, the load beam distal portion having a lift bracket thereon, the lift bracket comprising left and right hand cam followers and supports therefor, the cam followers and cam follower supports being formed with the load beam and unitary therewith and with each other, the lift bracket being adapted for camming engagement with a camming surface in head lifting relation relative to the disk and responsive to longitudinal shifting of the load beam.

In this and like embodiments, typically, the lift bracket cam follower comprises a portion of the load beam turned on itself along its longitudinal axis to define a camming surface, each lift bracket cam follower defines a generally cylindrical surface as the camming surface, and, the load beam distal portion has left and right hand edges and edge rails along a portion of each of the edges, each of the cam follower supports comprising a generally triangular web extending laterally from the load beam edge, each the web being outwardly folded onto itself along an axis normal to the load beam edge to define the cam follower.

Additionally, typically, the load beam lift bracket support webs comprise a triangular portion contiguous with the load beam edge, each web having at its apex lateral extents unitary with and in a common plane with the web, the lateral extents being folded toward each other in cam follower defining relation.

In this and like embodiments, typically, the cam followers each have generally cylindrical surfaces, the load beam, cam followers and cam follower supports are commonly formed from a single piece of spring steel, and, the load beam distal portion has left and right hand edges and edge rails along a portion of each of the edges, each of the cam follower supports comprising a generally triangular web extending laterally from the load beam edge as continued extents of the edge rails, each web being outwardly folded onto itself along an axis normal to the load beam edge to define the cam follower, the webs lying outward from the edge rails.

BRIEF DESCRIPTION OF THE DRAWINGS

The invention will be further described with reference to the attached drawings in which:

FIG. 1 is a perspective view of the invention apparatus;

FIG. 2 is a view taken on line 2—2 in FIG. 1; and,

FIG. 3 is a view taken on line 3—3 in FIG. 1.

DETAILED DESCRIPTION

As noted, the invention provides a unitary lift bracket for a load beam. The lift bracket is fabricated from the same stock as the load beam and is an integral part thereof, being formed with the load beam as part of the load beam forming process. Thus, when the load beam flat is formed as one of several on a fret from sheet stock, typically by an etching method, the web and cam follower antecedents are formed along with the rails and the balance of the load beam, all in a single flat plane. Thereafter, as part of later forming steps the rails, the web supports and the cam follower cylinders are formed in the distal portion of the load beam.

The invention provides torque-free lifting of the suspension comprising the load beam and flexure as the lifting impetus is received simultaneously on each side of the load beam in concert with the longitudinal shifting of the camming surfaces. The lifting impetus is provided by left and right cam followers supported by webs and defining a lift bracket extending transversely of the load beam. The structure of the cam followers is sufficiently strong as to enable the repeated lifting of the suspension. The lift bracket overall size is dictated by the space available, but it is an advantage of the presently disclosed design that it is intimately close with the load beam itself, being a part thereof rather than an added structure. The unitary nature of the present cam follower design reduces the number of parts to be assembled and fabrication is easily effected during load beam fabrication, as noted just above. The present invention lift bracket is quite small, readily formable, and located mid-body along the load beam. The present lift bracket left and right cam followers and supporting webs project sufficiently from the load beam main body to be easily contacted by the camming surfaces operating alongside the load beam.

With reference to the drawing, in FIGS. 1–3, the removable disk drive assembly 10 comprises a pair of upper and lower read/write heads 12u, 12l carried on a pair of suspensions 13, each comprising a flexure 14 supported by a load beam 16 having stiffening edge rails 17, 19. Upper and lower heads 12u, 12l are operatively associated with upper and lower surfaces 18, 20 of removable drive disk 22. The disk drive assembly 10 shows but a single disk for clarity of illustration, it being understood that the invention can be used with a plurality of disks in a stack. Load beams 16 are fixed to arm 24 of an actuator 26 which drives heads 12u, 12l across the disk 22 by shifting the load beam relative to the disk 22. Thusfar described, the disk drive assembly 10 is generally conventional, and only illustrative of suitable suspension and disk arrangements with which the invention is useful.

The very close proximity of the heads 12 to the disk surfaces 18, 20 is such that the disk 22 cannot readily be removed without damaging contact of these surfaces with the heads, unless the heads are lifted away slightly beforehand. The invention provides a rugged and reliable means for lifting the heads 12 in the form of a lift bracket 32 comprising a left hand cam follower 34 and a right hand cam follower 36, each being cylindrical in form so as to define cam follower surfaces 38, 40 outward from the load beam main body 42 across supporting webs 46, 48. The unitary integration of the webs 46, 48 with the load beam edge rails 17, 19, as shown, further enhances the lift bracket 32 strength. The entire lift bracket 32 is unitary with the load beam 16 from which it springs as a further portion of the metal from which the load beam is fashioned. Accordingly, the otherwise conventional load beam 16 is given laterally disposed left and right hand webs 46, 48, which taper outward and culminate in narrow, laterally projecting extensions 52, 54. The narrow extensions 52, 54 are folded upon themselves about their longitudinal axes to form the cylindrical structures 56, 58, comprising curved walls 62, 64 which oppose themselves at slots 66, 68.

For lifting contact with the cam follower surfaces 38, 40, pairs of generally conventional camming structures 70, 72 are provided, mounted to shift in parallel with the longitudinal axis of the load beam 16 to contact the cam follower surfaces 38, 40 in displacing relation, thus to lift the load beam unitarily formed with the cam follower surfaces, and the head 12 carried by the load beam. Thus, lifting of the heads 12 is effected by having cam follower cylindrical structures 56, 58 ride on cams defined by camming structures 70, 72 to lift the cam followers and thus the load beam 16 and suspension 13.

Advantageously, the unitary nature of the lift bracket and load beam precludes loss of the lift bracket or some portion thereof as may happen when the lift bracket is an assemblage of diverse parts and not a unitary whole with itself and with the load beam was well.

The fabrication of the present lift bracket has been described above as being a part of the load beam manufacturing process wherein a sequence of etching and forming steps are used to give the final shape to the load beam. In the case of the present invention, the conventional load beam-forming steps are varied to provide generally triangular webs 46, 48 laterally of the load beam main body 42, and integral with the load beam edge rails 17, 19, respectively; then there follows the shaping of the outer, non-triangular terminals of the webs into cylindrical structures 56, 58 which have curved walls 62, 64 and act as the cam followers.

The foregoing objects including providing a camming surface laterally of the suspension load beam and a cam follower, one that is unitary with the load beam and located rearwardly of the head and forwardly of the suspension actuator, has been met. The further object that longitudinal axial shifting of the camming surfaces engages the cam follower and lifts the read/write head relative to the disk drive disk, permitting disk removal or insertion without added structure being appended onto the suspension is also met.

I claim:

1. Load beam for supporting at its distal portion a flexure carrying a head in operative association with a disk drive having a removable disk and an actuator for shifting said load beam along its longitudinal axis, said load beam distal portion having left and right hand edges, said load beam edges having edge rails each extending a first and second given length along a portion of each of said edges, said edge rails being discontinuous between their said first and second lengths at said load beam edges such that said load beam edges have no edge rail at the locus of said edge rail discontinuity, portions of said first and second lengths of said edge rails on either side of each said discontinuity being outwardly deflected from said load beam edges said load beam having triangular webs extending laterally from said load beam edges and in the plane of said load beam between and unitary with said deflected edge rail first and second lengths to define lift bracket cam followers and supports formed with said load beam and unitary therewith and with each other, each said cam follower comprising a distal web portion turned on itself along its longitudinal axis to form a generally cylindrical cam follower surface extending normal to said load beam edge and adapted for camming engagement with a camming surface in head lifting relation relative to said disk and responsive to longitudinal shifting of said load beam.

2. The load beam according to claim 1, in which each said triangular web is contiguous with said load beam distal portion edge and has at its apex lateral extents in a common plane with said load beam in cam follower surface defining relation.

3. The load beam according to claim 2, in which said load beam and web are commonly formed from a single piece of spring steel.

4. The load beam according to claim 3, in which said cam follower surface defining lateral extents are open opposite their cam follower surfaces.

* * * * *